United States Patent [19]
Kang et al.

[11] Patent Number: 6,031,539
[45] Date of Patent: *Feb. 29, 2000

[54] FACIAL IMAGE METHOD AND APPARATUS FOR SEMI-AUTOMATICALLY MAPPING A FACE ON TO A WIREFRAME TOPOLOGY

[75] Inventors: Sing Bing Kang, Cambridge; Keith Waters, West Newton, both of Mass.

[73] Assignee: Digital Equipment Corporation, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/815,981
[22] Filed: Mar. 10, 1997
[51] Int. Cl.$^7$ .................................................. G06T 11/00
[52] U.S. Cl. .......................................... 345/419; 345/425
[58] Field of Search ................................. 345/419, 435, 345/425

[56] References Cited

U.S. PATENT DOCUMENTS

| | | | |
|---|---|---|---|
| 5,257,346 | 10/1993 | Hanson | 395/125 |
| 5,611,037 | 3/1997 | Hayashi | 345/442 |
| 5,659,625 | 8/1997 | Marquardt | 345/435 |
| 5,805,745 | 9/1998 | Graf | 382/291 |

OTHER PUBLICATIONS

Cootes, T.F., and Taylor, C.J., "Locating Faces Using Statistical Feature Detectors." Paper presented at the Proc. 2nd International Conference on Automatic Face and Gesture Recognition, Killington, Vermont (Oct. 1996).

"Facial Feature Localization and Adaptation of a Generic Face Model for Model–Based Coding", "Signal Processing": Image Communication, vol. 7, pp. 57–74, 1995.

"The Integration of Optical Flow and Deformable Models with Applications to Human Face Shape and Motion Estimation", CUPR, 1996, San Francisco, California, Jun. 1966, pp. 231–238.

"A Vision System for Observing and Extracting Facial Action Parameters", Procs. CVPR, Jun. 1994, Seattle, Washington, pp. 76–83.

"Realistic Modeling for Facial Animation", Computer Graphics Proceedings, Annual Conference Series, 1995, pp. 55–62.

ACM Siggraph; Computer Graphic; Keith Waters; A Mysle Model for Animating Three Dimensional Facial Express; pp. 17–24, Jul. 1987.

*Primary Examiner*—Mark R. Powell
*Assistant Examiner*—Huedung X. Cao
*Attorney, Agent, or Firm*—Hamilton, Brook, Smith & Reynolds, P.C.

[57] ABSTRACT

A method for mapping a digitized image of a face on to a reference wireframe topology in a computer system is provided, the image composed of pixels, the wireframe composed of interconnected nodes, the method including the steps of determining facial features from the pixels, determining facial landmark points from the facial features, computing displacements for each one of the interconnected nodes, and manually finetuning the displacements in response to the step of computing.

9 Claims, 10 Drawing Sheets

FACIAL IMAGE METHOD AND APPARATUS FOR SEMI-AUTOMATICALLY MAPPING A FACE ON TO A WIREFRAME TOPOLOGY

FIELD OF THE INVENTION

The present invention relates to the field of computer-generated modeling, and more particularly to the field of face modeling wherein a given real or synthetic face is mapped onto a wireframe.

BACKGROUND OF THE INVENTION

As is known in the art, DECface from Digital Equipment Corporation is a talking synthetic face application that is essentially a visual complement of a speech synthesizer application referred to as DECtalk, also from Digital Equipment Corporation. By combining the audio functionality of a speech synthesizer with the graphical functionality of a computer-generated face, a variety of engaging user interfaces can be developed. Examples include Internet-based Agents capable of seeking and retrieving Web documents to read, Avatars for Chat applications, and a front-end interface for kiosks.

As is known, DECface is a system that facilitates the development of applications requiring a real-time lip-synchronized synthetic face. The original version of DECface operates under Digital Unix and utilizes the X-Window system for display. The current version of the DECface now functions under W32 NT or Windows 95 operating systems and can be embedded into Web browsers as a plugin. One of the core pieces of DECface is the ability to adaptively synchronize the audio to the image being displayed as described in U.S. patent application Ser. No. 08/258,145 entitled *Method and Apparatus for Producing Audio-Visual Synthetic Speech*, filed by Waters et al. on Jun. 10, 1994. In Waters et al., a speech synthesizer generates fundamental speech units called phonemes, which can be converted to an audio signal. The phonemes can be translated to their visual complements called visemes (known as distinct mouth postures). The result is a sequence of facial gestures approximating the gestures of speech.

One of the components of DECface is face modeling, where a given synthetic, or real image of a face, can be mapped onto a wireframe geometry that has be shaped to the contours and features of a face. As is known in this art, the process of face modeling has been manual, labor intensive and time consuming, as every node on the wireframe geometry has to be positioned by hand. In the manual process, a new image of the face is displayed onto which a wireframe geometry is roughly positioned. The user then steps though each individual node in the face geometry and repositions the current selected two dimensional (2-D) node location to match the contour, or feature, of the face.

In the prior art, some techniques for mapping geometry to images of faces have been documented. One such exemplary method relies on automatically detecting eyes, tip of the nose, and mouth using eigenfeatures as templates. The face geometry is then initialized by affine warping the face geometric model based on the detected facial feature locations. However, this form of global transformation is generally an approximation, as facial ratios across different faces do not change linearly in general.

Another exemplary method of initializing a facial geometry is to manually mark out specific facial features such as eyebrow centers and mouth corners. In addition to the requirement of manual selection, the face model in this exemplary method requires explicit connectivity information in the computation of the new node location within the image.

It is highly desirable to accurately map the geometry of DECface to an arbitrary frontal image of a face. Furthermore, expediting the process from a fully manual process to a semi-automatic procedure can dramatically reduce the time taken to map a new image of a person's face.

SUMMARY OF THE INVENTION

In accordance with the present invention, a method for mapping a digitized image of a face on to a reference wireframe topology in a computer system is provided, the image composed of pixels, the wireframe composed of interconnected nodes, the method including the steps of determining facial features from the pixels, determining facial landmark points from the facial features, computing displacements for each one of the interconnected nodes, and manually finetuning the displacements in response to the step of computing.

DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanied drawings, wherein:

DETAILED DESCRIPTION OF THE PREFERRED EMBODIMENTS

Figure 1:
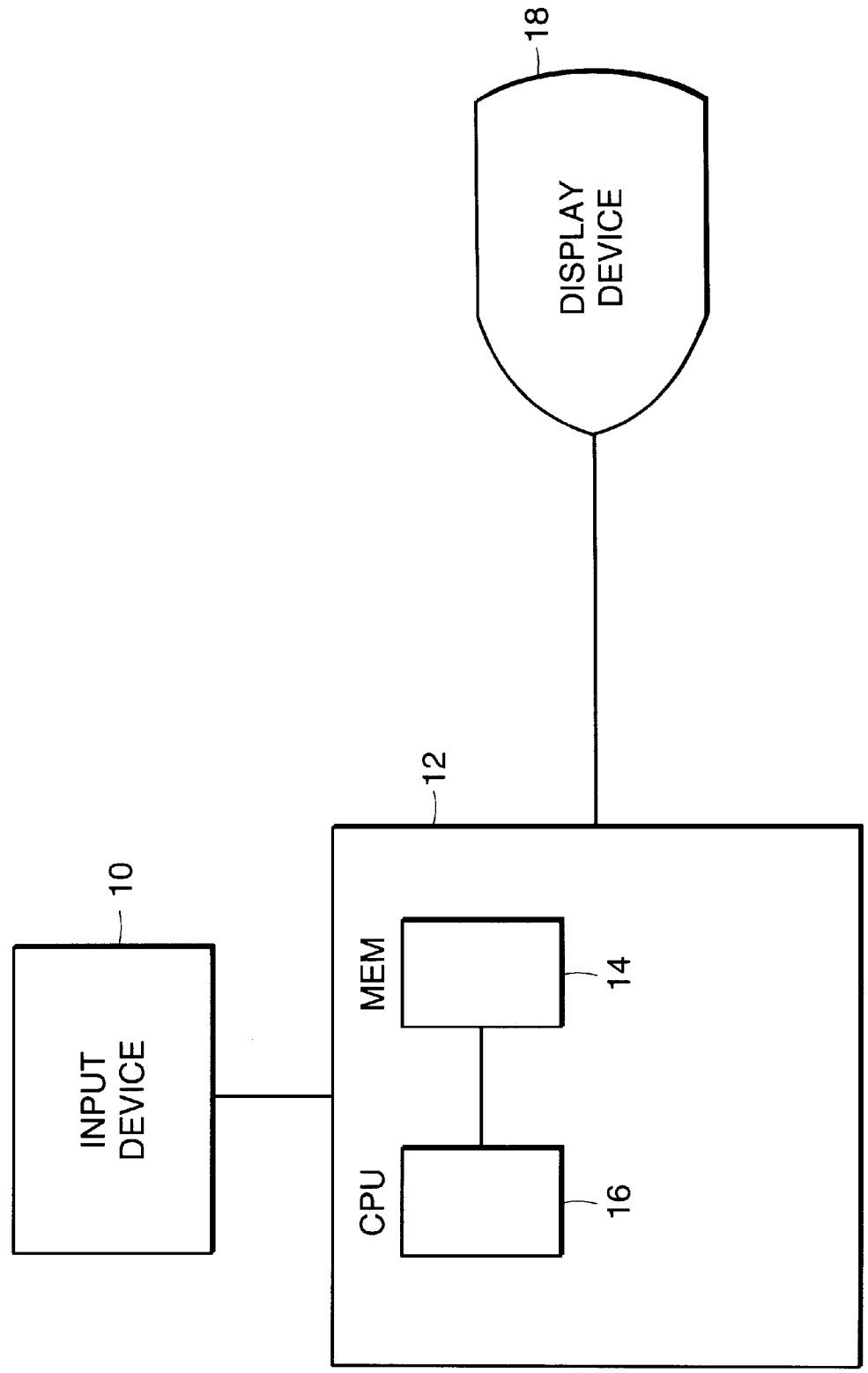
FIG. 1 is a block diagram of an exemplary computer system employing the present invention.

Referring to FIG. 1, an exemplary system employing the principles of the present invention includes an input device 10 connected to a computer system 12 having at least a memory 14 and a central processing unit (CPU) 16. The input device 10 may be any device which can provide a digital image to the computer system 12, such as a camera or scanning device. In the exemplary system of FIG. 1 the computer system 12 is shown connected to a display device 18.

Figure 2:
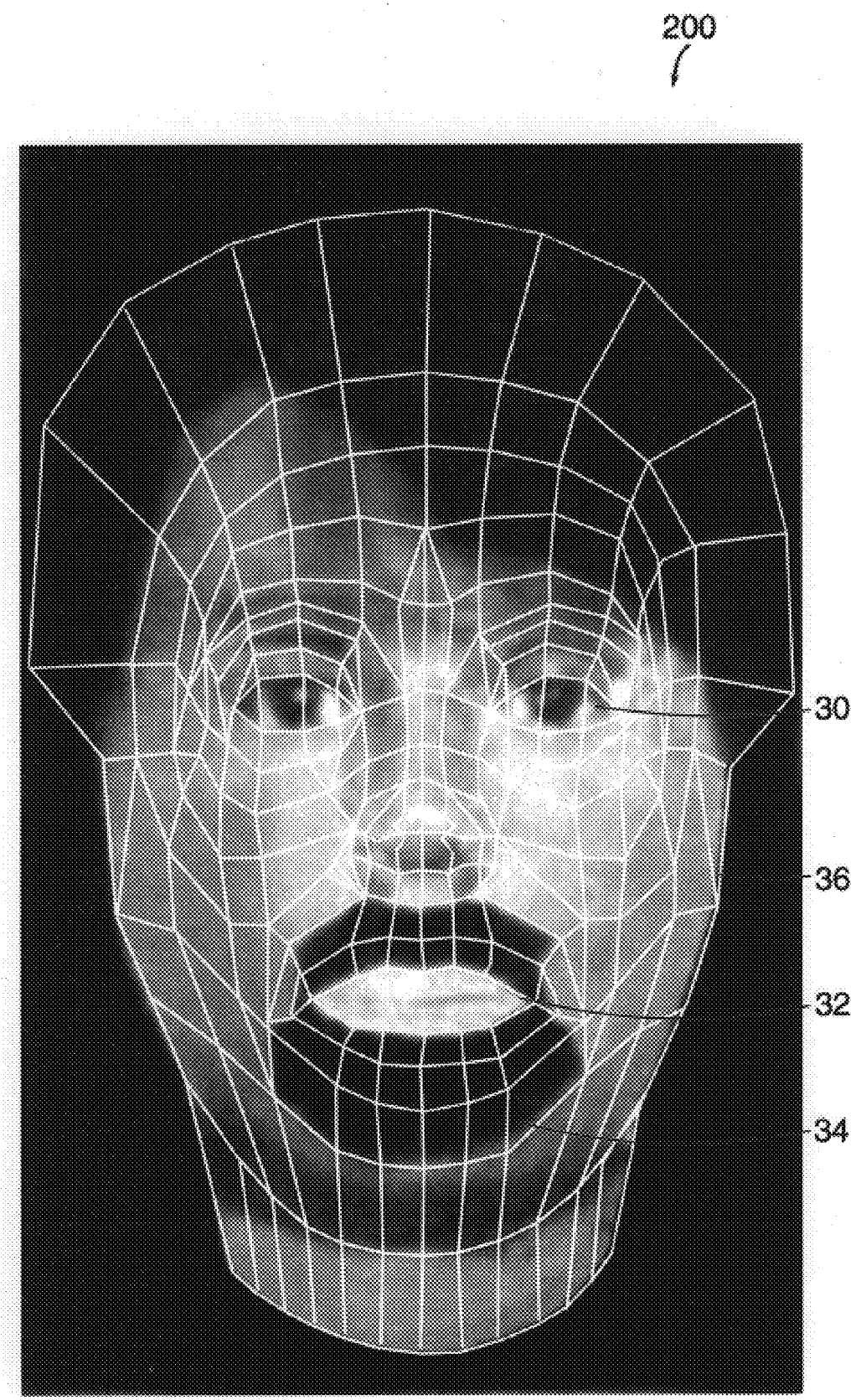
FIG. 2 is diagram of a reconfigured facial geometry of a face image.

Referring to FIG. 2, an exemplary reconfigured facial geometry of a face image is illustrated. In FIG. 2, the intersection of each line is referred to as a node. The nodes around the eyes 30, mouth 32, chin 34, and face margins 36 are shown to consist of what are referred to as closely aligned nodes. Topologies for facial synthesis are typically created from explicit three dimensional (3D) polygons. For simplicity, the present invention constructs a simple two dimensional (2D) topology of the full frontal view because, for the most part, personal interactions occur face-to-face. The exemplary model in FIG. 2 consists of 200 polygons of which 50 represent the mouth 32 and an additional 20 represent the teeth. The jaw nodes are moved vertically as a function of displacement of the corners of the mouth 32. The lower teeth are displaced along with the lower jaw. Eyelids are created from a double set of nodes describing the upper lid, such that as they move, the lids close.

An accompanying feature to the Digital Equipment Corporation's DECface is the ability for any user to customize the image of DECface to any desired face image. The principal idea of this feature is to transform the original DECface's geometric topology and configuration to be consistent with the new face image.

The present invention (fully described below) is semiautomatic and requires some manual fine tuning subsequent to automatic eye, mouth, and face contour location.

Referring now to FIGS. 3A–3E, the present invention begins with the generation of a reference face (also referred to as a composite face) 100. By way of example, the reference face 100 is shown as a morphed composite face of several faces labeled 102, 104, 106, and 108, respectively. The reference face 100 may be generated by using any number of faces, and the usage of faces 102–108 in FIGS. 3B–3E is but one example that utilizes four faces. The reason for using a composite face 100 as opposed to using one of the faces 102–108 as a template is that the composite face 100 would contain average features common to typical faces. This would result in better chances of matching parts of the composite face 100 with those of any individual face.

Figure 3A:
FIG. 3A is a diagram of a reference face.
Figure 3B:
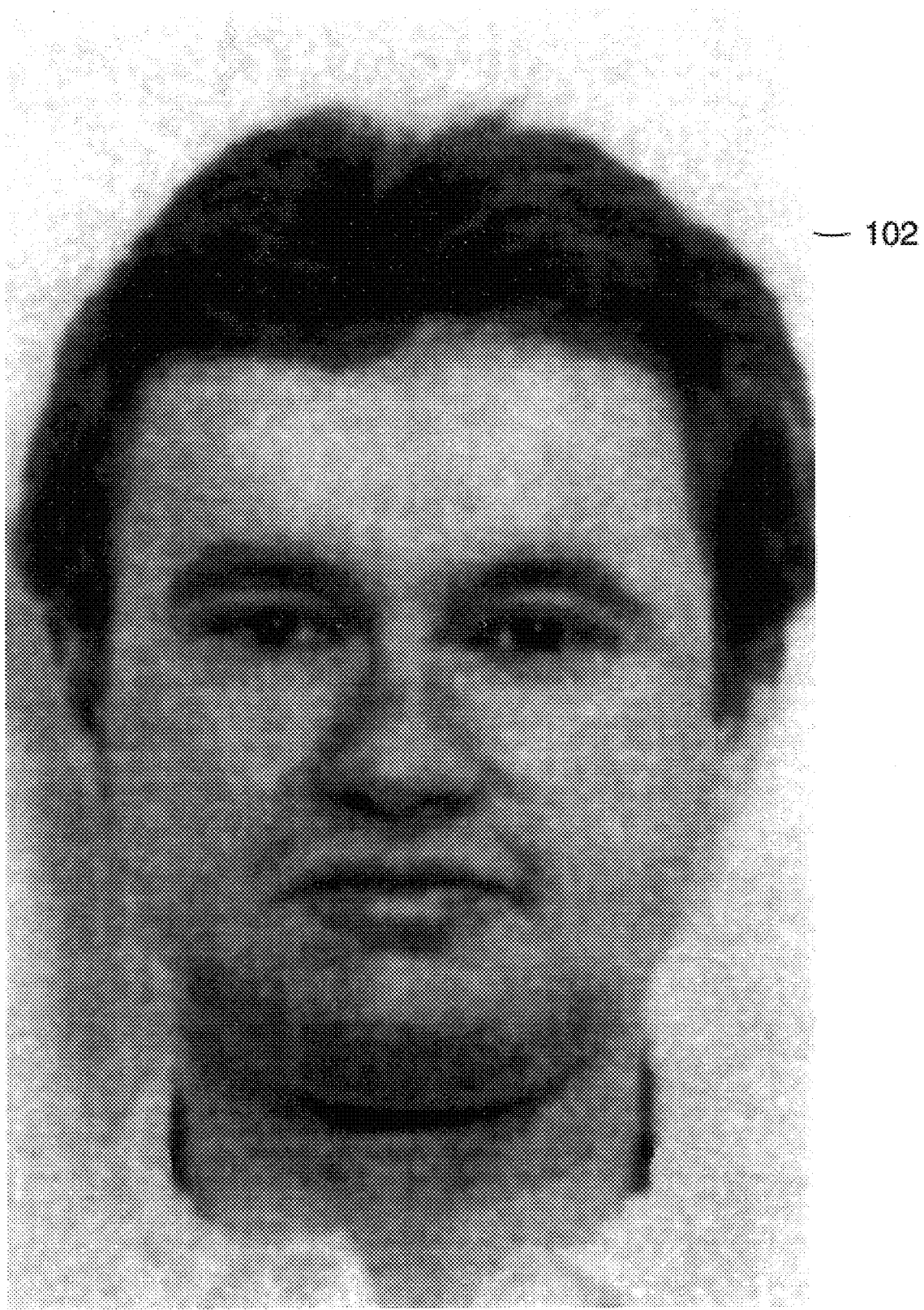
FIGS. 3B–3E are exemplary diagrams of faces used to create the reference face of FIG. 3A.
Figure 3C:
Figure 3D:
Figure 3E:
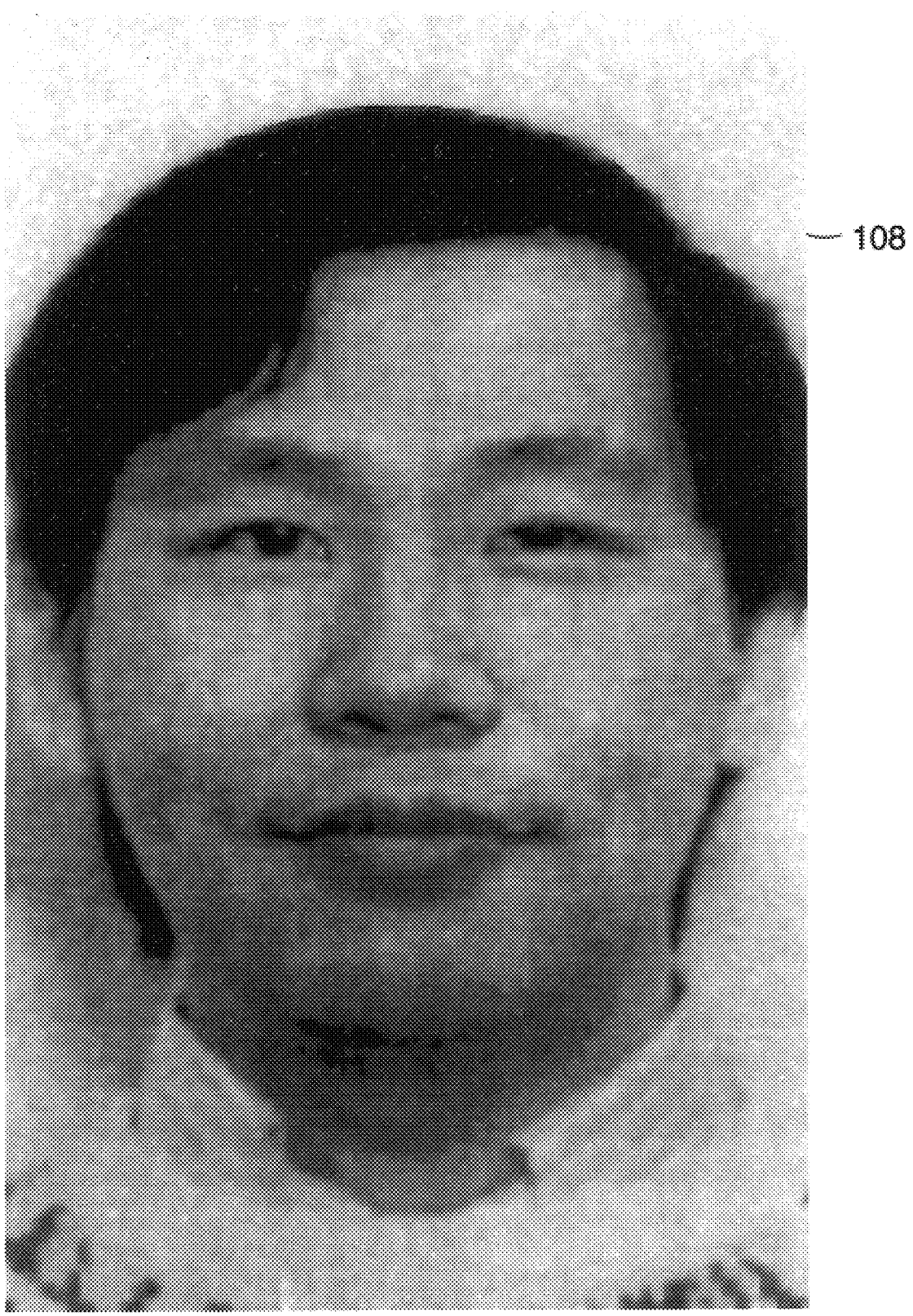

The composite face 100 is created by picking corresponding points of faces 102–108 and morphing them using the software package as described in *Using the Snappy Video Snapshot*, by R. Blackwell, Play, Inc., 1992, incorporated herein. Thus, as shown in FIG. 3A, the reference face 100 is composed of the four different faces labeled 102, 104, 106, and 108, respectively, as shown in FIGS. 3B–3E.

Figure 4:
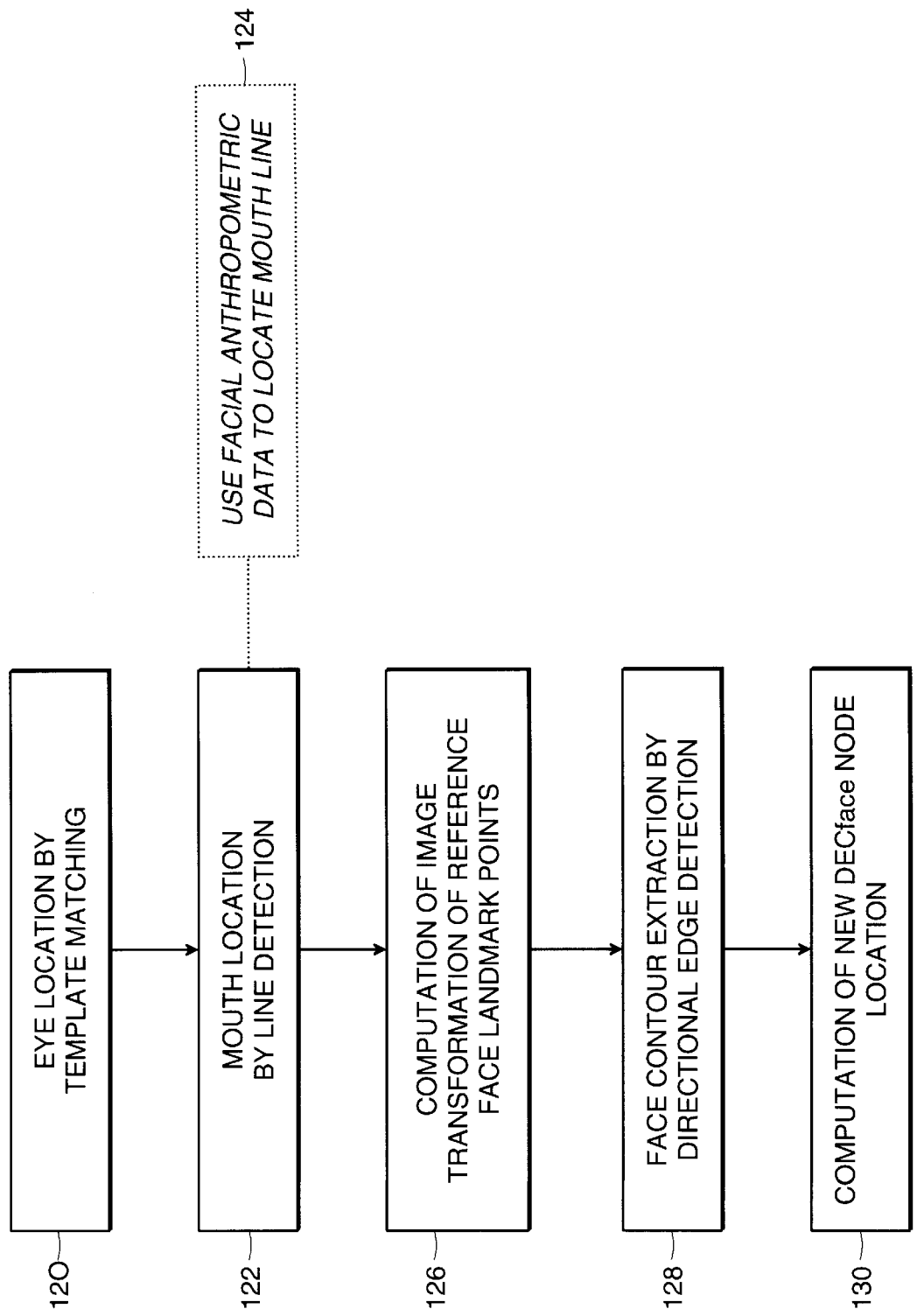
FIG. 4 is a flow diagram in accordance with the principles of the present invention.

Referring now to FIG. 4, a flow diagram of the present invention is shown to begin at step 120 wherein the eye locations are determined using one of several techniques, such as template matching or an eigenfeature approach. At step 122, the mouth location is determined using also one of the several techniques, such as template matching or an eigenfeature approach. The eye and mouth locations are used to globally compute a shift and scale of a facial landmark distribution. At step 124, facial anthropometric data describing the approximate human facial proportions to be used in the location of the mouth relative to the eyes.

At step 126, an image transformation of the reference face landmark points is computed. At step 128, face contour extraction is computed using directional edge detection. In the preferred embodiment, directional edge detection is computed using a discrete sampling of profile points to search for face profile. Other methods of computing directional edge detection includes snakes, i.e., active contour models. Finally, at step 130, a facial node location is computed and the result displayed on the display device.

Figure 5:
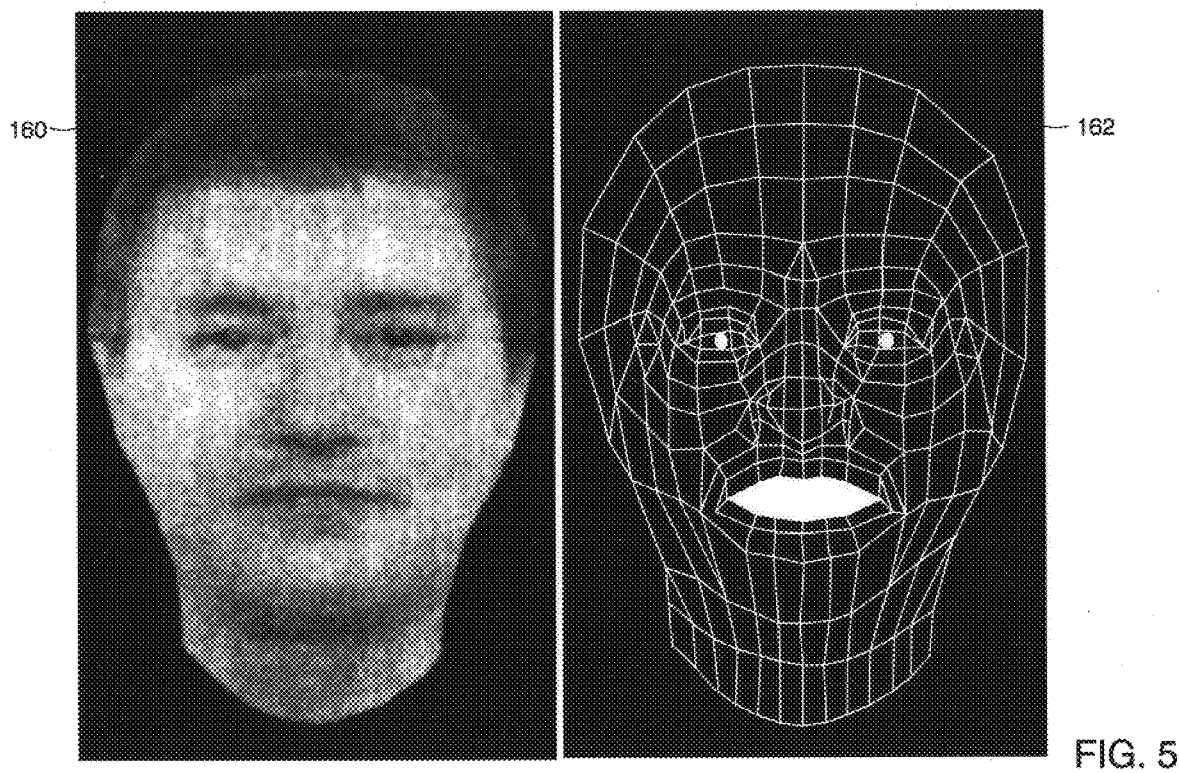
FIG. 5 is a diagram of a composite face image (left) with its corresponding facial geometry (right), also referred to as a wireframe.

Referring to FIG. 5, an exemplary reference DECface image 160 which is actually a composite of four different faces of real people and its corresponding facial geometry 162 is illustrated.

As mentioned previously, the preferred embodiment uses a technique of template matching for locating the eyes and mouth. Template matching is used because of its simplicity and because the appearance of the eye is not expected to vary significantly. This is because the posture of the face in the image is expected to be uniformly frontal and appearing at approximately the same size.

Figure 6:
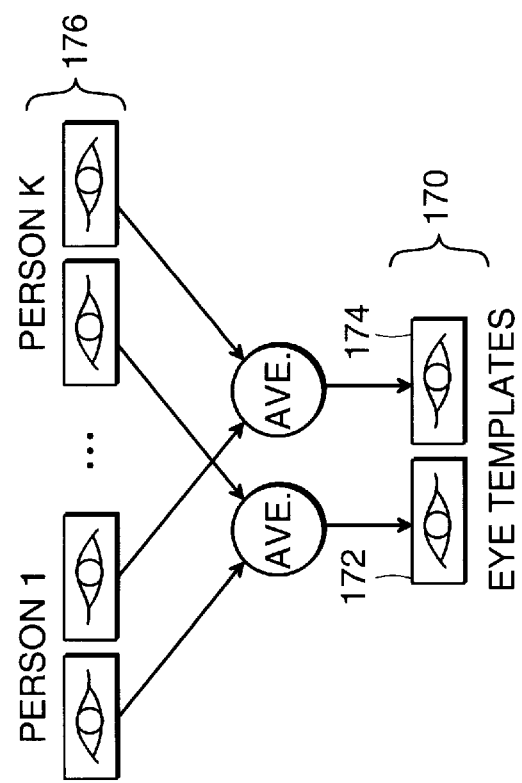
FIG. 6 is a diagram illustrating the creation of an eye template.

Referring now to FIG. 6, a difference with this template matching technique employed in the preferred embodiment is the use of an "average" eye template 170. A left eye template 172 and a right eye template 174 are separately used and are manually cropped out from the reference face image. Recall that the reference face is a result of blending several different faces 176. An advantage of using such a template is that eye appearance characteristics that are peculiar to a certain individual are de-emphasized while commonalities are reinforced.

The optimal eye locations are determined through template matching by minimizing the intensity error variance between the eye templates and the face image. This ensures that the objective function, shown in the following equation, is less sensitive to global changes in intensity.

$$\min_{x,y}\left(\frac{1}{lm}\sum_{q=0}^{m-1}\sum_{p=0}^{l-1}D_{pqxy}^2 - \left[\frac{1}{lm}\sum_{q=0}^{m-1}\sum_{p=0}^{l-1}D_{pqxy}\right]^2\right)$$

where $$D_{pqxy} = I_F(p+x, q+y) - I_E(p, q),$$

$I_F$ being the face image, $I_E$ the eye template, and l and m being the eye template dimensions.

Once the eyes have been located, the bounding box for the mouth can be determined using a heuristic based on anthropometric data 124. The lip separation line is then located within the mouth bounding box by summing intensities at every row and picking the row with the lowest sum. (This technique is also called integral projection.) This is because the lip separation line is generally the darkest area in the mouth.

It has been observed that for a face in an upright position, the horizontal positions of the left and right eye pupils correspond approximately with those of the left and right ends of the mouth. This dictates the horizontal dimension and location of the mouth bounding box. The vertical mid-position of the bounding box is taken to be below the eyes by the same amount as the eye separation. The vertical length of the bounding box is 0.4 times the eye separation.

As was described with reference to FIG. 4, once the eyes and mouth locations have been determined, the next step is to globally transform the entire set of reference face landmark points to correspond to the new face image. This is done by first solving for s the scaling factor, and g, the global displacement using the following equation, with j=1, 2, 3 (index for left eye, right eye, and mouth respectively). $p_{j,ref}$ is the original location in the reference face image while $p_j$ is the computed location in the new face image.

$$p_j = s(p_{j,ref} + g)$$

Once s and g have been computed, all the reference face landmark point locations are then shifted to yield a better estimate of the face landmark point locations for the new face image.

Using a global two dimensional (2D) transform to get the new face landmark point locations is obviously insufficient. This is because of the variation in human face shape, the face contour may be incorrectly determined. To correct this, the next step is then to refine the face contour location.

Figure 7:
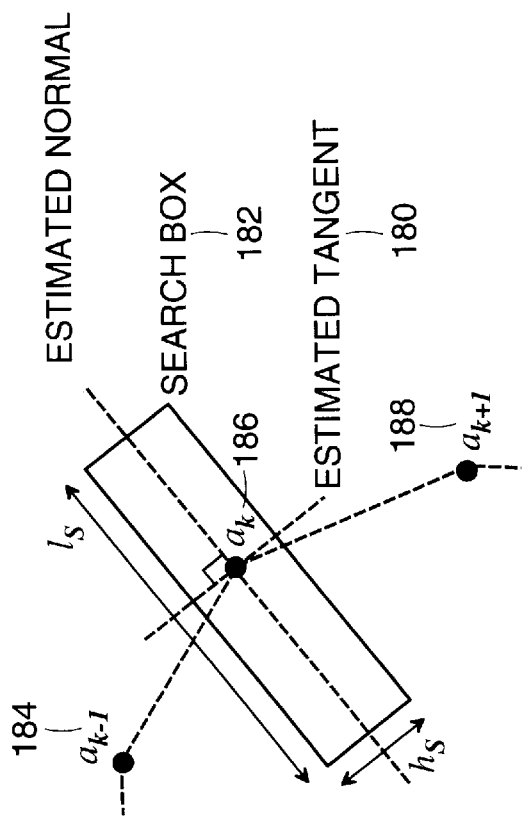
FIG. 7 is a diagram illustrating the detection of part of a face contour.

Referring now to FIG. 7, the approach to finding a face contour in the preferred embodiment is to locate strong edges parallel to an estimated tangent 180 to current face contour. A search area 182 for a given face contour landmark point is shown in FIG. 11. The tangent 180 at a landmark point is estimated to be the parallel to the line passing through its adjacent points. An alternative, but possibly less efficient, would be to use a group of short deformable lines to extract the face contour. The dimensions of the search box 182 are $l_s$ (=60) and $h_s$ (=10). $\alpha_{k-1}$ 184, $\alpha_k$ 186, $\alpha_{k+1}$, 188 are the three facial landmark points that are part of the face contour.

The DECface node distribution is different from that of the facial landmark points. The facial landmarks point distribution is chosen for their intuitive placement and is physiologically meaningful, e.g., the locations at the eye corners. Given the facial landmark point distribution (and hence the shifts relative to the reference facial landmark point distribution), the task is to determine the new DECface node distribution. In the preferred embodiment this is done by interpolating the DECface node shifts ($d'_j$) from the shifts in the facial landmark points ($d_i$) as shown in the following two equations. M (=50) and N (=263) are the number of facial landmark points and DECface nodes respectively.

$$a_i = a_{i,ref} + d_i, i=1, \ldots, M$$

$$n_j = n_{j,ref} + d'_j, j=1, \ldots, N$$

The interpolation scheme used in the preferred embodiment to find $d'_j$ is a function of proximity to the landmark points as shown in the following two equations. (We set $\eta=2$.)

$$d'_i = \sum_{i=1}^{N} w_{ij} d_i$$

where $$w_{ij} = \frac{\prod_{l=1, l \neq i}^{M} |n_{j,ref} - a_{l,ref}|^{\eta}}{\sum_{k=1}^{M} \prod_{l=1, l \neq k}^{M} |n_{j,ref} - a_{l,ref}|^{\eta}}$$

Having described a preferred embodiment of the invention, it will not become apparent to one skilled in the art that other embodiments incorporating its concepts may be used. It is felt therefore, that this embodiment should not be limited to the disclosed embodiment, but rather should be limited only by the spirit and the scope of the appended claims.

What is claimed is:

1. A method for mapping a digitized image of a face on to a reference wireframe topology in a computer system, the image composed of a plurality of pixels, the wireframe composed of a plurality of interconnected nodes, the method comprising the steps of:

automatically determining a plurality of visible facial features from the plurality of pixels;

automatically determining a plurality of facial landmark points from the plurality of visible facial features using a contour of the image;

based on the determined facial landmark points, computing displacements for each one of the plurality of interconnected nodes, and manually fine tuning the displacements in response to the step of computing.

2. The method for mapping a digitized image of a face on to a reference wireframe topology according to claim 1 wherein the step of determining the plurality of facial landmark points from the plurality of facial features comprises the steps of:

determining two eye locations and an approximate pupil location for each one of the two eye locations; and determining an approximate mouth location.

3. The method for mapping a digitized image of a face on to a reference wireframe topology according to claim 2 wherein the step of determining the two eye locations comprises the steps of:

determining a template for each of two eyes; and determining the location in a new face image corresponding to a best correlation with the two eye templates.

4. The method for mapping a digitized image of a face on to a reference wireframe topology according to claim 3 wherein the step of determining the mouth location comprises the steps of:

using an anthropometric ratio involving a separation of the two eyes to estimate an approximate mouth location;

determining the mouth location by finding a darkest horizontal line in a vicinity of the approximate mouth location.

5. The method for mapping a digitized image of a face on to a reference wireframe topology according to claim 4 further comprising the steps of:

computing a global transform of the plurality of facial landmark points;

determining a contour of the image by locating a plurality of strong edges parallel to an estimated tangent of an estimated contour; and using the final distribution of the plurality of facial landmark points to compute a local displacement of each one of said plurality of reference wireframe nodes.

6. The method of claim 3 wherein further the step of determining the location in a new face of the eye templates is determined by minimizing an intensity error variance between the two eye templates and the digitized image of a face.

7. The method for mapping a digitized image of a face on to a reference wireframe topology according to claim 4 wherein the anthropometric ratio determines the approximate mouth location by drawing a box having a horizontal length approximately the separation of the pupils of the two eyes, and the box having a horizontal and vertical midpoint located vertically below a midpoint of a line connecting the pupils by a distance approximately equal to the pupil separation.

8. The method for mapping a digitized image of a face on to a reference wireframe topology according to claim 4 wherein the finding of a darkest horizontal line in a vicinity of the approximate mouth location is performed by integral projection.

9. A method for mapping a digitized image of a face on to a reference wireframe topology in a computer system, the image composed of a plurality of pixels, the wireframe composed of a plurality of interconnected nodes, the method comprising the steps of:

determining a plurality of facial features from the plurality of pixels;

determining a plurality of facial landmark points from the plurality of facial features by determining a contour of the image by locating a plurality of strong edges parallel to an estimated tangent of an estimated contour to compute a global displacement factor;

determining a contour of the digitized image to compute local displacement factors;

computing displacements for each one of the plurality of interconnected nodes to transform the reference wireframe to the image, and manually fine tuning the displacements from the step of computing.

* * * * *